United States Patent
Gong

(10) Patent No.: US 10,479,370 B2
(45) Date of Patent: Nov. 19, 2019

(54) SYSTEM AND METHOD FOR AUTHORIZING A USER TO OPERATE A VEHICLE

(71) Applicant: Ford Global Technologies LLC, Dearborn, MI (US)

(72) Inventor: Wenger Gong, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 16/256,552

(22) Filed: Jan. 24, 2019

(65) Prior Publication Data

US 2019/0263415 A1    Aug. 29, 2019

(30) Foreign Application Priority Data

Feb. 23, 2018    (CN) .......................... 2018 1 0154579

(51) Int. Cl.
| | |
|---|---|
| B60W 40/08 | (2012.01) |
| G06K 9/00 | (2006.01) |
| B60R 25/25 | (2013.01) |
| G07C 9/00 | (2006.01) |

(52) U.S. Cl.
CPC ............ *B60W 40/08* (2013.01); *B60R 25/25* (2013.01); *G06K 9/00288* (2013.01); *G07C 9/00158* (2013.01); *B60W 2040/0809* (2013.01)

(58) Field of Classification Search
None
See application file for complete search history.

(56) References Cited

U.S. PATENT DOCUMENTS

| | | | |
|---|---|---|---|
| 7,110,570 B1 | 9/2006 | Berenz et al. | |
| 8,988,188 B2 | 3/2015 | Chang | |
| 10,229,461 B2* | 3/2019 | Akiva | ...................... G06Q 40/08 |
| 10,373,415 B2* | 8/2019 | Atsumi | ............. G07C 9/00309 |
| 2008/0252412 A1 | 10/2008 | Larsson et al. | |

(Continued)

OTHER PUBLICATIONS

Ford Moves toward Facial Recognition and Gesture UI in the Car—Jun. 26, 2014 http://www.zdnet.com/article/ford-moves-toward-facial-recognition-and-gesture-ui-in-the-car.

(Continued)

*Primary Examiner* — Carlos Garcia
(74) *Attorney, Agent, or Firm* — Alice Xu; Kolitch Romano LLP

(57) ABSTRACT

A system for authorizing a user to operate a vehicle comprises first and second image capturing devices disposed inside and outside the vehicle to capture first and second images of the user, respectively; an identification device to compare the first image with a first stored user image, generate a first output, and upload the first image to the database as a second stored user image if a matching degree of the first image with the first stored user image is greater than a first threshold. The identification device further compares the second image with the second stored user image and generates a second output if a matching degree of the second image and the second stored user image is larger than a second threshold. The system further comprises first and second operation execution devices to perform first and second vehicle operations upon the first and second outputs, respectively.

20 Claims, 7 Drawing Sheets

(56) References Cited

U.S. PATENT DOCUMENTS

2009/0157268 A1* 6/2009 Chiba .................. G08G 1/16
 701/53
2015/0363986 A1 12/2015 Hoyos et al.
2016/0300410 A1 10/2016 Jones et al.

OTHER PUBLICATIONS

Auto Anti-theft System Based on Face Recognition and Vehicle Telematics http://harman.in/blog/auto-anti-theft-system-based-on-face-recognition-and-vehicle-telematics.

* cited by examiner

SYSTEM AND METHOD FOR AUTHORIZING A USER TO OPERATE A VEHICLE

RELATED APPLICATION

This application claims the benefit of Chinese Patent Application No. CN 201810154579.5, filed Feb. 23, 2018, the entire contents thereof being incorporated herein by reference.

FIELD

The present application relates to systems and methods for authorizing a user to operate a vehicle, particularly, relates to systems and methods for authorizing a user to operate a vehicle based on the user images.

BACKGROUND

Some vehicles have an authorization system to allow user access to the vehicles based on identification of a user. For example, an authorization system unlocks a vehicle door upon only one successful identification of the user. There may be an issue for such authorization system. For example, when the user is far away from the vehicle, other people can get into the vehicle. In another example, an authorization system unlocks the vehicle door based on successful identification of the user twice. In such system, the first successful identification of the user unlocks a vehicle door, and the second successful identification of the user allows operation of an engine or a starter. The second identification recognizes the user based on further comparison of a captured image of the user inside the vehicle and a stored image in the authorization system. Identification failure can occur due to the image quality if the image is taken in a dark environment and a camera is too close to the user, resulting in low resolution image. Therefore, there is a need for an authorization system with desired identification success rate.

SUMMARY

The present disclosure provides a system for authorizing a user to operate a vehicle. The system comprises a first image capturing device, a second image capturing device, an identification device, a first operation execution device, and a second operation execution device. The first image capturing device is disposed outside the vehicle for capturing a first image of the user. The second image capturing device is disposed inside the vehicle for capturing a second image of the user. The identification device is configured to compare the first image with a first stored user image in a database, generate a first output, and upload the first image to the database as a second stored user image if a matching degree of the first image with the first stored user image is greater than a first threshold. The identification device is further configured to compare the second image with the second stored user image, and generate a second output if a matching degree of the second image and the second stored user image is larger than a second threshold. The first operation execution device is configured to perform a first vehicle operation upon the first output, and the second operation execution device is configured to perform a second vehicle operation upon the second output.

In some embodiments, the first image capturing device may be located on an exterior door frame of the vehicle at a driver side, and the second image capturing device may be located on a steering wheel or a dash board by the driver side.

In some embodiments, the database may be in a server in communication with the vehicle or a storage medium in the identification device.

In some embodiments, the first threshold may be smaller than the second threshold.

In some embodiments, the identification device may compare the first image with the first stored user image via facial recognition.

In some embodiments, the identification device may be further configured to compare the second image with the second stored user image based on auxiliary feature identification. The auxiliary feature may include one of clothes colors, collars, accessories, hairstyles of the user in the second image and the second stored user image.

In some embodiments, the matching degree of the second image and the second stored user image may be calculated based on a weighted matching degree of facial recognition and auxiliary features identification.

In some embodiments, the first vehicle operation may include unlocking a vehicle door, and the second vehicle operation may include starting an engine of the vehicle.

In some embodiments, the system may further include a mobile device. The mobile device may have a user interface for receiving inputs from a user to initiate the system, outputting notifications of vehicle operations to be performed to users, receiving inputs of confirmation on the vehicle operations from users, and outputting notifications of completed vehicle operations to users.

In some embodiments, the user interface may be further configured to receive an instruction to update the database, and the identification device may be further configured to upload the second stored user image to the database and replace the first stored user image based on the instruction.

In some embodiments, a plurality of first images corresponding to a plurality of users may be stored in the database, and the identification device may be further configured to identify a current user is one of the plurality of users.

In some embodiments, the second vehicle operation may further include setting a group of vehicle functions to those associated with the one of the plurality of users.

The present disclosure further provides a method for authorizing a user to operate a vehicle. The method comprises: receiving a first image of a user outside the vehicle with a first image capture device; comparing the first image with a first stored user image in a database to determine a first matching degree between the first image and the first stored user image; performing a first vehicle operation by a first operation execution device and uploading the first image to the database as a second stored user image if it is determined that the first matching degree is greater than a first threshold; receiving a second image of the user inside the vehicle from a second image capture device; comparing the second image with the second stored user image to determine a second matching degree between the second image and the second stored user image; and performing a second vehicle operation by a second operation execution device if it is determined that the second matching degree is larger than a second threshold.

In some embodiments, the first matching degree may be determined based on facial recognition, and the second matching degree may be determined based on facial recognition and auxiliary feature identification.

In some embodiments, the second matching degree may be a weighted average of matching degree of the facial recognition and the auxiliary feature identification.

In some embodiments, the first vehicle operation may include unlocking a vehicle door, and the second vehicle operation includes starting an engine of the vehicle.

In some embodiments, the method may further include receiving inputs of initiating the system from users, outputting notifications of vehicle operations to be performed to users, receiving inputs of confirmation of the vehicle operation from users, and outputting notifications of completed vehicle operations to users.

In some embodiments, the notifications may be output to users via a text or an audio message.

In some embodiments, the method may further include receiving inputs of updating the database, uploading the second stored user image to the database and replacing the first stored user image.

In some embodiments, the method may further include pre-storing a plurality of first stored user images corresponding to a plurality of users in the database to determine whether a current user is one of the plurality of users. The second vehicle operation may include setting a group of vehicle functions to those associated with the one of the plurality users.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The above advantages and other advantages, and features of the present description will be readily apparent from the following detailed description when taken alone or in connection with the accompanying drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed systems and methods for authorizing a user to operate a vehicle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems and methods for authorizing a user to operate a vehicle are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
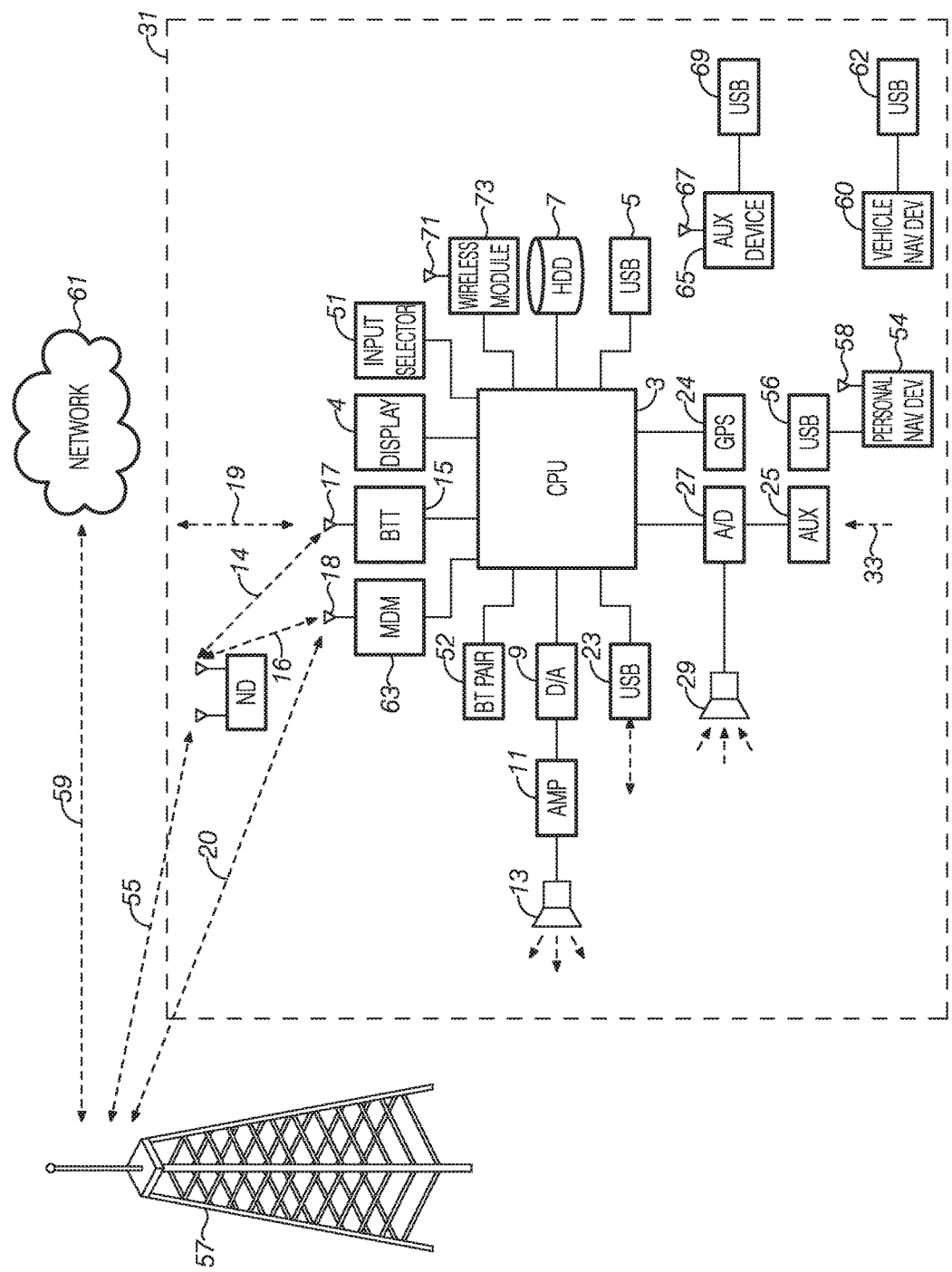
FIG. 1 is a block topology of a vehicle computer system (VCS) for a vehicle in which embodiments of the present disclosed may be implemented.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

The controller may include at least one microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle. The controller 30 may communicate with various engine/vehicle sensors and actuators via input communication channels and output communication channels that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In example embodiments, the system and/or method for authorizing a user to access a vehicle according to embodiments of the present disclosure can be implemented via the VCS mentioned above. The user may initiate an authorization process using the VCS or a mobile device. Then the VCS or a remote server in communication with the VCS may perform the authorization process, and the VCS may perform related vehicle operations if the authorization process is successful. The system may be used for a private car to prevent unauthorized users to use the car. The system may be used by car rental companies to facilitate management of cars. In such way, the car rental companies are able to perform vehicle operations of various rental cars via remote control, and users can access and control a rental car using only his/her mobile device.

Figure 2:
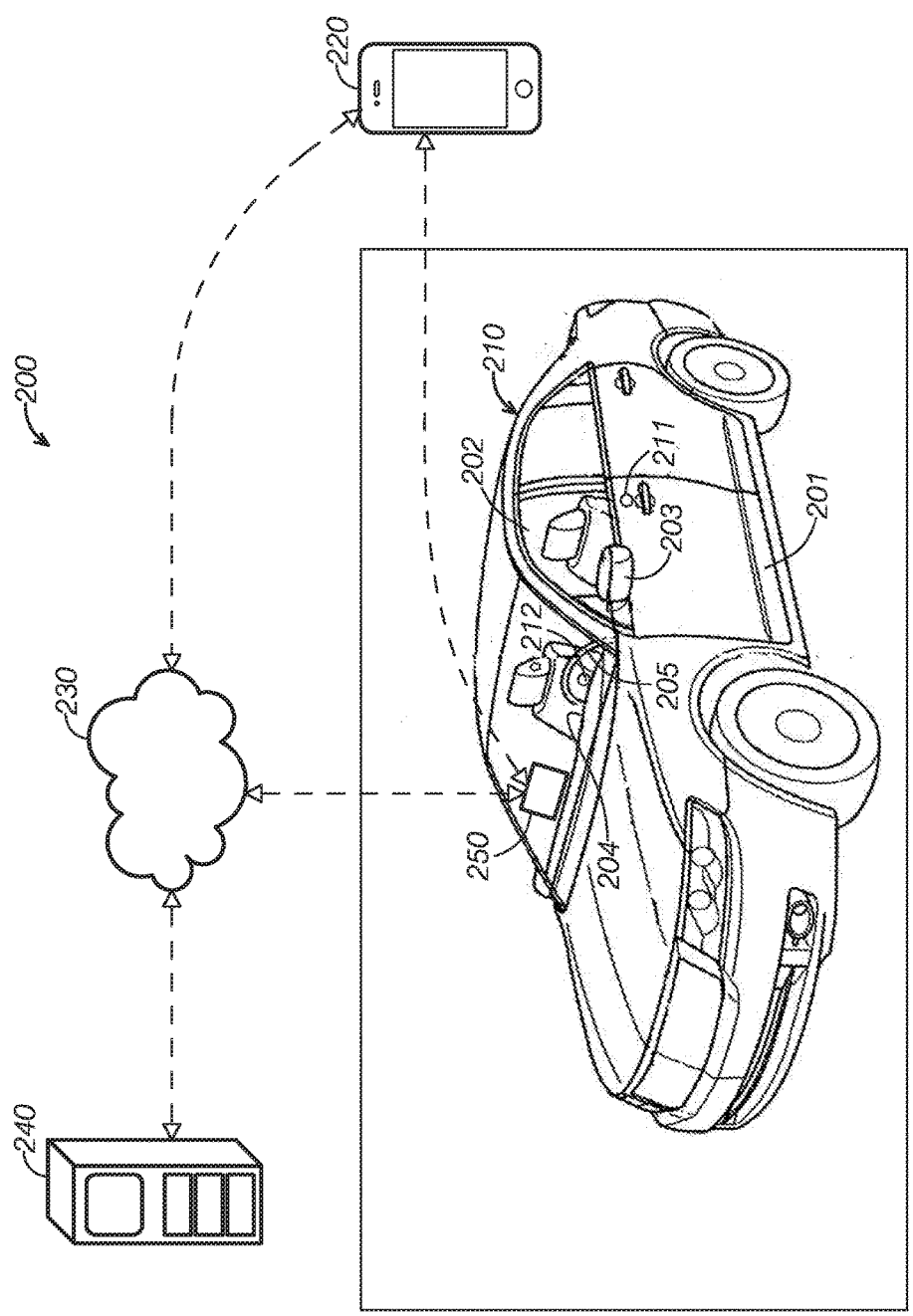
FIG. 2 is a block topology of a system for authorizing a user to access a vehicle according to an embodiment of the present disclosure.

FIG. 2 is a block topology for a system 200 for authorizing a user to operate a vehicle. The system 200 may include a vehicle 210, a mobile device 220, a network 230, and a remote server 240. The vehicle 210 may include a VCS 250, which may be the computing system 1 as described in FIG. 1 or a system has similar structures and functions to the computing system 1. The mobile device 220 may be a nomadic device. Communications between the mobile device 220 and the VCS 250, the network 230, the remote server 240 may be referred to the VCS 1 of FIG. 1. Referring to FIG. 2, the system 200 may include at least two image capturing devices 211, 212 disposed on the vehicle 210. For example, a first image capturing device 211 and a second image capturing device 212 may be used to capture images of a user or a driver outside or inside the vehicle 201, respectively. As shown in FIG. 2, the first image capturing device 211 is disposed at exterior of the vehicle 210, such as on an exterior panel frame 201 by the driver side, a door window glass 202, or a rearview mirror 203, for capturing a first image of the user outside the vehicle 210. The second image capturing device 212 is disposed at the interior of the vehicle 210, such as on a dashboard 204, steering wheel 205, or interior door panel by the driver side (not shown), for capturing a second image of the user inside the vehicle 210.

It should be appreciated that the first and second image capturing devices 211, 212 may be disposed on any appropriate places of the vehicle. For example, the first image capturing device 211 may be coupled to any parts of the vehicle where images of the user can be obtained when the user is outside the vehicle, and the second image capturing device 212 may be coupled to any parts of the vehicle where images of the user can be obtained when the user is inside the vehicle.

In some embodiments, the first and second image capturing devices 211, 212 may be cameras for capturing 2D or 3D images of the user. The second image capturing device 212 may include a 3D camera for obtaining a depth map of the user and the interior of the vehicle. The 3D camera may include any suitable devices known in this art, which are compatible with the vehicle and used for this purpose. A suitable 3D camera may be prepared using PMD technology. Another 3D camera may be a COMS camera, which works by measuring distortions of lighted samples. Those cameras may form a desired depth map of the vehicle interior depending on active illumination. In some embodiments, the 3D cameras may be flash imaging laser radar, which captures the entire vehicle interior via lasers or light pulses. The selection of the second image capturing device 212 may depend on various parameters including cost, packaging size, and accuracy requirements for the image. It should be appreciated that, the first and second image capturing devices 211, 212 may be any appropriate image capturing devices used to capture a still image or a video stream.

The system 200 may include an identification device for identifying captured images of the user and an operation execution device for performing related vehicle operations. The identification device may be integrated in the VCS 250, or in the remote server 240 in communication with the VCS 250 over the network 230.

Figure 3:
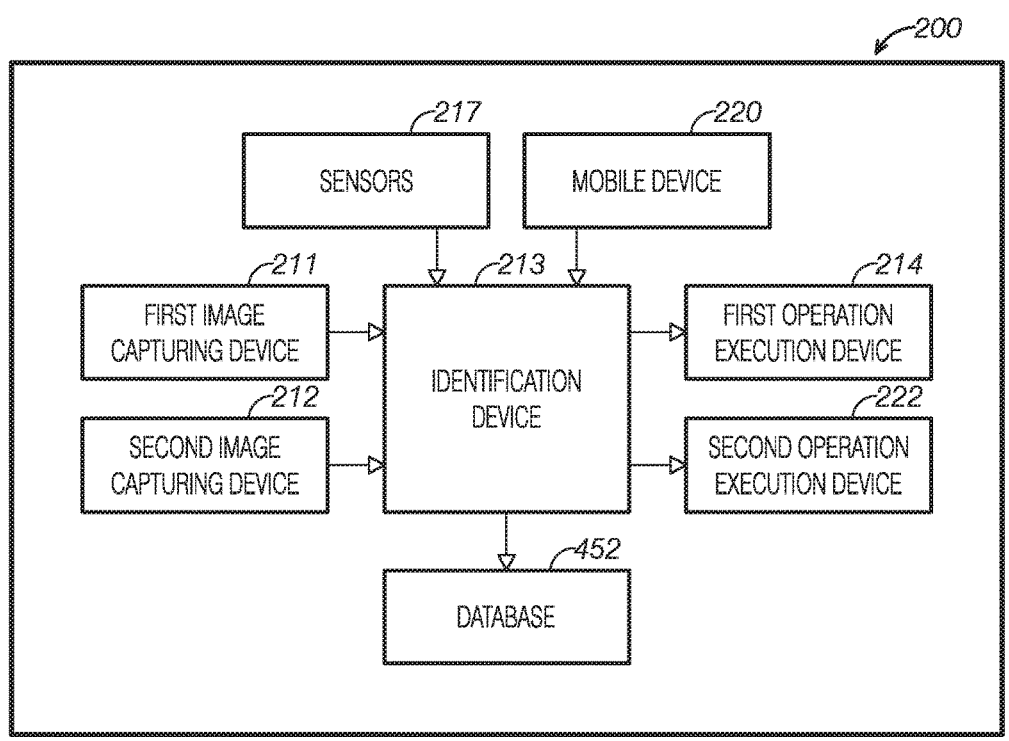
FIG. 3 is a block diagram of the system of FIG. 2.

FIG. 3 is a block diagram of the system 200. Referring to FIGS. 2 and 3, the system 200 may include an identification device 213, a first operation execution device 214, and a second operation execution device 222. The identification device 213 may include a controller having an independent processor and storage medium and in communication with the VCS 250. In some embodiments, the identification device 213 may be incorporated into the VCS 250. In some embodiments, the identification device 213 may be integrated in a server (e.g., the server 240) and the user can subscribe the server for the service. In this way, a software or application for face recognition or related identification technology may be updated via the server without updating the VCS 250 or the entire system 200. The identification device 213 may identify images captured by the first and second image capturing devices 211, 212 by comparing those images with pre-stored user images in a database 215 and generate outputs. The first and second operation execution devices 214, 222 may receive those outputs and perform the vehicle operations based on the received information from the identification device 213 (e.g., unlock a vehicle door or starts engine if the conditions are met).

The database 215 may be installed in the VCS 250 or in the server 240 that is communication with the vehicle 210. As described in this application, the user may update the stored user image via a user interface of the mobile device 220 or VCS 250 once authorization is successful.

The system 200 may further include one or more sensors 217. The sensors 217 may be configured to detect if a user is approaching the vehicle or if a user is seated and send signals for automatically activating the first and second image capturing devices 211, 212 if the user is approaching the vehicle or seated. The sensors 217 may be a motion sensor, a temperature sensor, a pressure sensor, a radar, or combinations thereof.

Figure 4A:
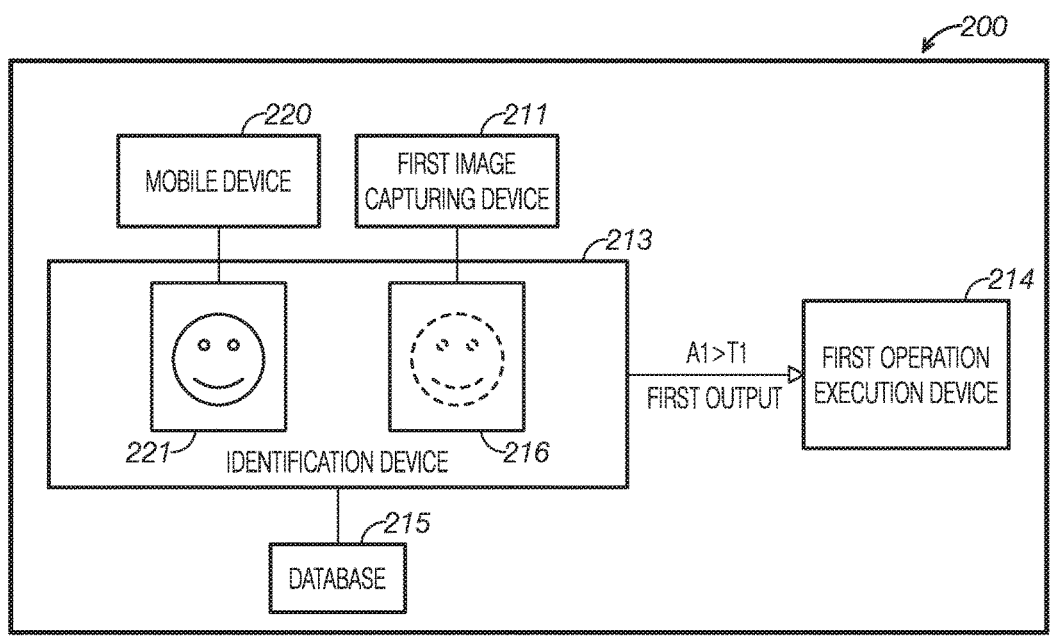
FIGS. 4A-4B schematically illustrate an identification process of a system for authorizing a user to access a vehicle according to one embodiment of the present disclosure.
Figure 4B:
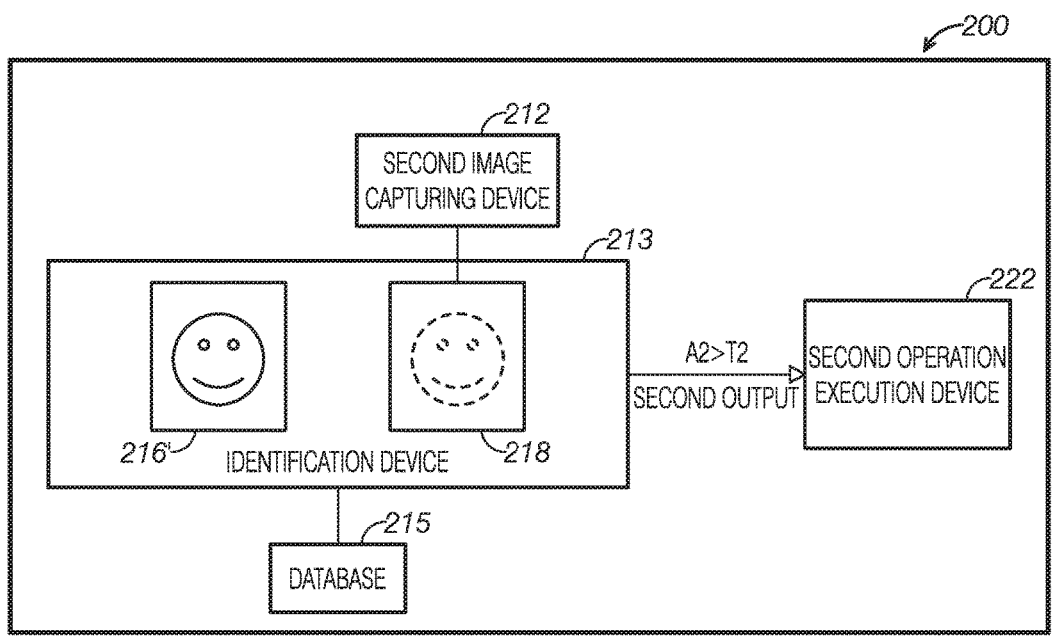

FIGS. 4A-4B illustrate working processes of the system 200. In some embodiments, an enrollment may be performed before the system 200 initiates an authorization process. For example, a user may register and upload his/her image to the database 215 over the network 230 using the mobile device 220. The image may be pre-stored as a first stored user image 221 in the database 215 in the VCS 250 or the remote server 240. The mobile device 220 may be a smart phone or a remote key fob. The user may make the enrollment using other devices such as a personal computer. In some embodiments, the user may complete the enrollment before the authorization process. For example, the first stored user image 221 may be pre-stored in the database 215. The user may initiate the authorization process using the mobile device 220. With reference to FIG. 4A, when the user initiates the authorization process using the mobile device 220, the sensors 217 in the vehicle 210 may detect that the user is approaching the vehicle 210 and the first image capturing device 211 starts to capture a first image 216 of the user when the user is outside the vehicle 210. Then, the identification device 213 may compare the first image 216 with the first stored user image 221 and determine a first matching degree A1 between the first image 216 and the first stored user image 221. If A1 is greater than a first threshold T1, a first output is generated. The first image 216 may include a face image of the user. The identification device 213 may identify the first image 216 or determine the first matching degree A1 via face recognition technology which is known to those skilled in the art.

In some embodiments, a first threshold T1 may be set in a range of about 80% to about 90%, such as 85%. The first operation execution device 214 may receive the first output/ instruction and perform a first vehicle operation. The first operation execution device 214 may be a door controlling device, and the first vehicle operation may include unlocking a vehicle door.

In some embodiments, the identification device 213 may upload the first image 216 to the database 215 to generate a second stored user image 216'.

Figure 6:
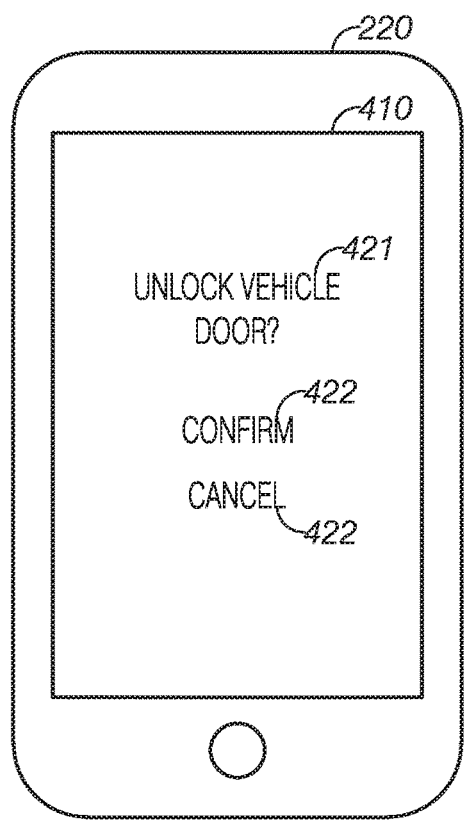
FIG. 6 shows a user interface of a mobile device of the system according to one embodiment of the present disclosure.

In some embodiments, the mobile device 220 may include a user interface 410 to receive inputs of initiating the authorization process from the user. The user interface may further be configured to output the vehicle operations to be performed to (e.g., unlocking the door), receive confirmation on the vehicle operation from the user, and notify the vehicle operations that is performing or has completed. In some embodiments, the mobile device 220 may inform the user the successful identification via a text message or an audio message if it is determined that the first matching degree A1 is greater than the first threshold T1. For example, the text message like "unlock the door? confirm—cancel" may be displayed on the screen. After the unlocking operation is confirmed by the user (e.g., "confirm" is selected on the screen or the vehicle operation is confirmed by an audio message), the vehicle door is unlocked FIG. 6 shows a user interface 410 of the mobile device 220. As shown in FIG. 6, once the first image 216 is identified successfully, a vehicle operation 421 (i.e., "Unlock Vehicle Door" for example) may appear on the screen. The selection buttons/links 422 such as "Confirm" and "Cancel" may be displayed on the user interface 410 as well for the user to select. The user may select the vehicle operations 421 by clicking the button designated for "Confirm.". It should be appreciated that the user interface 410 may be positioned in any other suitable places on the vehicle, such as on an exterior door frame of the vehicle. In this way, the user can communicate with the authorization system without the need to carry the mobile device 220.

In some embodiments, the user may input the instructions to update the database 215 via the user interface 410 of the mobile device 220. For example, the user may type the message "updating the database" and "uploading the second stored user image" such that the first stored user image 221 will be replaced. In this way, the success rate of image identification can be increased due to comparison of real time image even though some facial features may be changed with the time. It should be appreciated that the user may communicate with any appropriate device to send the instructions/commands to update the store images. For example, the user may enter the instructions on a user interface of the VCS or a personal computer.

FIG. 4B illustrates a second stage of the authorization process. Once the first image 216 is identified successfully, the vehicle door may be unlocked automatically, or unlocked upon the user confirmation using the user interface 410 such that the user can open the door of the vehicle 210. In some embodiments, the second image capturing device 212 may be activated when a sensor mounted in the interior of the vehicle 210 detects that the user is seated. The sensors may be a pressure sensor or a weight sensor positioned in the seat, a sensor in vehicle safety systems, or combinations thereof. The second image capturing device 212 captures a second image 218 of the user when the user is inside the vehicle 210. The identification device 213 receives the second image 218, and compares the second image 218 with the second stored user image 216' in the database 215 to determine a second matching degree A2 between the second image 218 and the second stored user image 216'. If the second matching degree A2 is greater than a second threshold T2, a second output is generated. In some embodiments, the second threshold T2 may be larger than the first threshold T1, for example, in a range of about 85% to about 95%, such as about 90% in one example. The second operation execution device 222 receives the second output and performs a second vehicle operation. The second vehicle operation may include starting an engine or starting a starter of the vehicle 210. By requiring two stage identifications, an unauthorized person can be prevented to operate the vehicle even if he or she enters the vehicle 210.

In some embodiments, the second vehicle operation further includes adjusting rear view mirrors or a driver seat, starting an air conditioning device, or a GPS device of the vehicle 210.

Similar to embodiments described with reference to FIG. 4A, the system 200 may further includes outputting messages and receiving inputs via text or audio messages on the user interface 410 of the mobile device 220 when the second stage of the authorization process illustrated in FIG. 4B is performed.

In some embodiments, in addition to identify the second image 218 via facial recognition, the identification device 213 may determine the second matching degree A2 based on additional or auxiliary features. The additional feature identification may include comparing auxiliary features in the two images, including but not limited to clothes color, glasses, accessories, hairstyles of the user, and combinations thereof. The second identification may be affected by various factors such as light and capturing angle because as the second image is taken inside the vehicle. Further, a stored image in database may be deviated from the captured image if it is taken long time ago.

Figure 5:
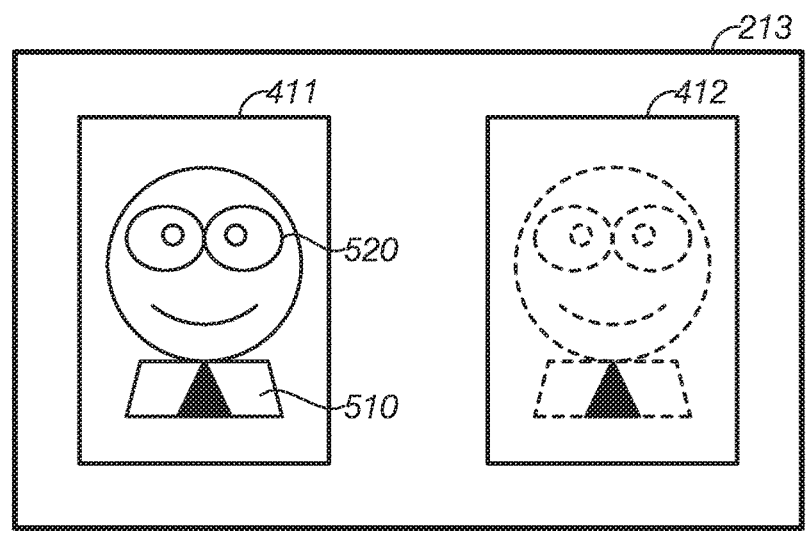
FIG. 5 illustrates a second identification process of an identification device according to another embodiment of the present disclosure.

FIG. 5 illustrates a second identification process of the identification device 213 according to another embodiment. As shown in FIG. 5, a second stored user image 411 is updated with a first image captured during a first identification process with the cameras mounted outside the vehicle, and then is compared with a second image 412 captured with the camera inside the vehicle, such as the second image capturing device 212. During the second identification, in addition to facial recognition, auxiliary features of the user in both images are compared, including clothes color, accessories like glasses, neckless or earrings, hairstyles, etc. FIG. 5 shows auxiliary features of collar 510 and glasses 520.

In some embodiments, both facial features and auxiliary features are identified or compared between the second image 412 and the second stored user image 411, and a weighted matching degree WMA can be determined as the second matching degree. For example, the weighted matching degree WMA may be an average among a facial matching degree FA, a clothes matching degree CA, and a glass matching degree GA with each component weighted with a percentage as follows: $WMA=FA*W1+CA*W2+GA*W3$, where W1, W2, and W3 are weight factors of respective matching degrees. In some embodiments, the clothes matching degree CA may be determined based on identification of clothes color and/or collar features.

In one example, a first matching degree and a second matching degree determined by a conventional authorization process may be 92% and 75%, respectively. The second matching degree is lower and may cause identification failure when the second threshold T is set to be 85%. With the system and method of the present disclosure, if FA, CA, and GA are 81%, 98%, and 97%, W1, W2, and W3 are 0.6, 0.2, and 0.2, the weighted matching degree WMA can be 87% for the same user. As the second image and the second stored user image have various similar features such as clothes collar 510 and glasses 520, the weighted matching degree is greater than the second matching degree based on the facial feature alone. In this way, the possibility of identification successes for the same user in the two stage processes can be increased.

In some embodiments, a same vehicle may be driven by a plurality of users who have a same user ID. In an example, the user ID can be used by persons in a same family. In these embodiments, a plurality of first images corresponding to a plurality of users may be pre-stored in the database. The identification device 213 is further configured to determine a current user is a specific one of the plurality of users, and then start the authorization process as shown in FIGS. 4A and 4B. For example, the first output may further include specific user information, and the second vehicle operation may further includes set a group of vehicle functions to those corresponding to the specific user. For example, upon a successful first identification, the system 200 determines the current user to be authorized is a user X; upon a successful second identification, a group of vehicle functions may be set to those preferred by the user X and pre-stored in the system 200, such as seat position, music albums, GPS interface, and air conditioner parameters, etc.

Figure 7:
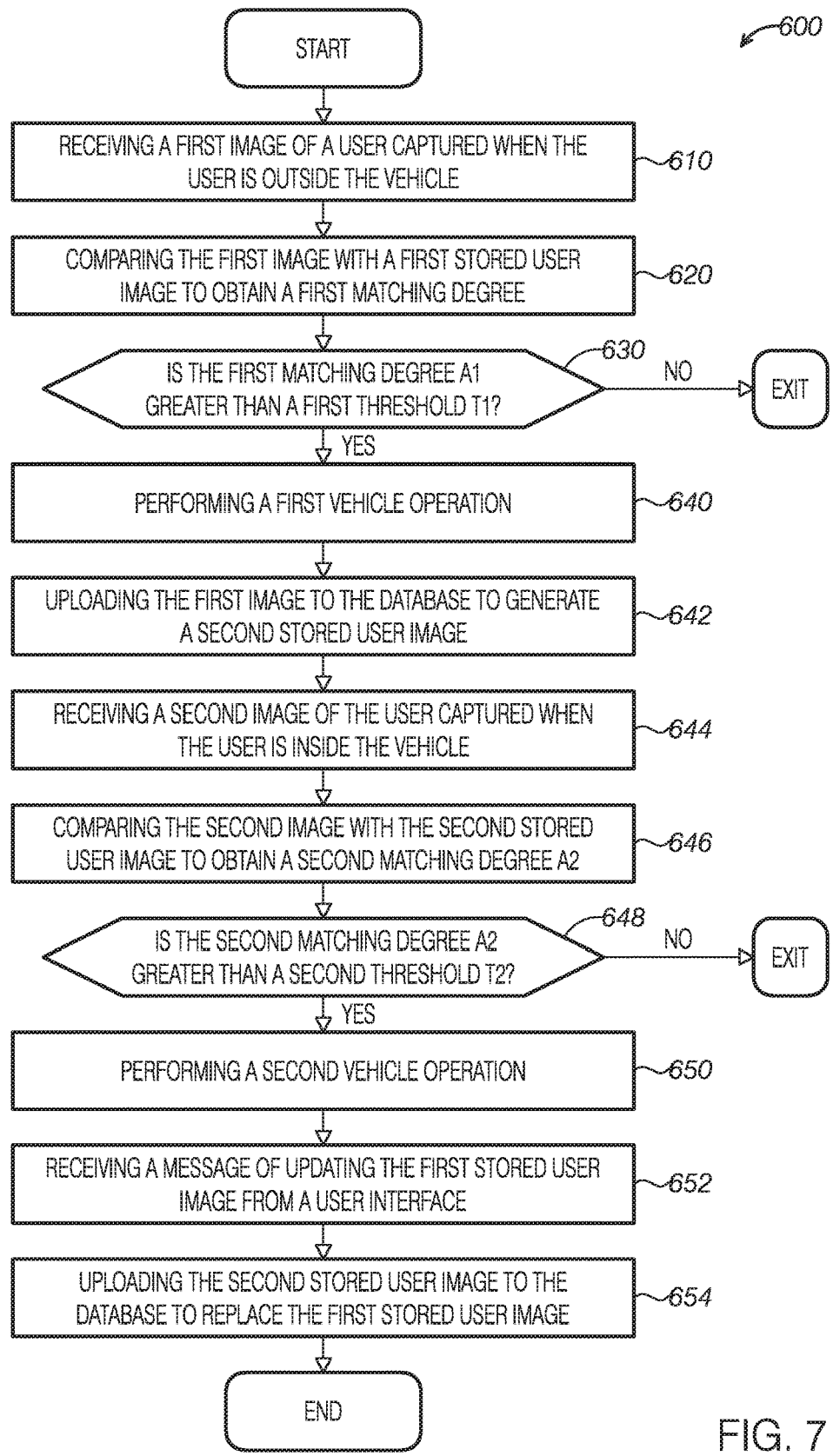
FIG. 7 is a flow chart illustrating a method for authorizing a user to access a vehicle according to an embodiment of the present disclosure.

FIG. 7 is a flow chart illustrating a method 600 for authorizing a user to operate a vehicle 600. At 610, the method 600 includes receiving a first image of the user captured when the user is outside the vehicle. At 620, the method 600 includes comparing the first image with a first stored user image to obtain a first matching degree A1. The first stored user image may be pre-stored in a database.

At 630, the method 600 may include determining if the first matching degree A1 is greater than a first threshold T1. If A1 is less than T1, the method 600 determines that the user is not an authorized user of the vehicle and the routine ends. In some embodiments, if A1 is smaller than T1, the method 600 may return to steps 610 and/or 620 to repeat image capturing and image comparing several times, such as three times. If A1 is greater than T1, the method 600 include performing a first vehicle operation at 640. In some embodiments, the first vehicle operation includes unlocking a vehicle door such that the user can open the vehicle door. Next, at 642, the method 600 may include uploading the first image to the database to generate a second stored user image.

At 644, the method 600 may include receiving a second image of the user captured when the user is inside the vehicle. At 646, the method 600 may include comparing the second image with the second stored user image to obtain a second matching degree A2. Next, at 648, the method 600 may include determining if the second matching degree A2 is greater than a second threshold T2. If A2 is less than T2, the method 600 ends. In some embodiments, if A2 is smaller than T2, the method 600 may return to steps 644 and/or 646 to repeat steps of capturing a image and comparing the image several times, such as once or three times. If A2 is greater than T2, the method may performing a second vehicle operation at 650. In some embodiments, the second vehicle operation may include starting the vehicle, such as starting a motor or an engine of the vehicle. In some embodiments, the second vehicle operation may further include performing additional vehicle operations customized to a specific user of a plurality of authorized users. The additional operations may include but not limited to adjusting a rear-view mirror or a driver seat position, starting an air conditioning device or GPS or setting up entertaining functions.

Next, at 652, the method 600 may include receiving a message of updating the first stored user image from a user interface. At 654, the method may include uploading the second stored user image to the database to replace the first stored user image. That is, the first stored user image in the database may be updated by a recently captured image upon confirmation or authorization of the user.

In some embodiments, the method 600 may further include other steps. In one example, the method 600 may include receiving instruction to initiate the driver authorization from the user, sending notifications of vehicle operations to be performed to users, receiving confirmation of the vehicle operation from the user, sending notifications of completed vehicle operations to users, and combinations thereof. The steps of sending notifications and/or receiving confirmation may be included in appropriate steps of the method 600. The notifications may be sent via texts and/or audio messages.

Detailed implementations of the method 600, such as capturing images, identifying images, performing operations, and the like may refer to the system 200 with reference to FIGS. 2 and 3, and will not described in detail.

The systems and methods of authorizing a user to operate a vehicle according to the present disclosure include two image identification processes/stages. The first identification process authorizes an operation of a vehicle door and allows an authorized user to enter the vehicle by unlocking the vehicle door and the second identification process authorizes a start of the vehicle after the user is in the vehicle. The second identification process decrease the risk of an unauthorized user to operate the vehicle. In addition, a first image captured during the first identification process is used as a reference image for the second identification process, and thus the identification success rate of the second identification process can be increased despite the environment in which the second image is taken and the deviation of the second image from the previously stored image. Further, the second identification process may be based on auxiliary feature identification in addition to facial recognition, which further increases the identification success rate of the second identification process.

Note that the method in embodiments of the present disclosure may be executed by application instructions stored in a computer readable medium in a mobile device. The example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It should be appreciated that the embodiments described above are specific examples that do not encompass all possible forms of the disclosure. The features of the illustrated embodiments may be combined to form additional or alternative embodiments of the disclosed concepts. The words used in the specification are words of description rather than limitation, and it is understood that changes can be made without departing from the spirit and scope of the disclosure. The scope of the following claims is broader than the specifically disclosed embodiments and includes modifications of the illustrated embodiments.

The invention claimed is:

1. A system for authorizing a user to operate a vehicle, comprising:
   a first image capturing device disposed outside the vehicle to capture a first image of the user;
   a second image capturing device disposed inside the vehicle to capture a second image of the user;
   an identification device to compare the first image with a first stored user image in a database, generate a first output, and upload the first image to the database as a second stored user image if a matching degree of the first image with the first stored user image is greater than a first threshold, compare the second image with the second stored user image, and generate a second output if a matching degree of the second image and the second stored user image is larger than a second threshold; and
   a first operation execution device to perform a first vehicle operation upon the first output and a second operation execution device to perform a second vehicle operation upon the second output.

2. The system of claim 1, wherein the first image capturing device is located on an exterior door frame of the vehicle at a driver side, and the second image capturing device is located on a steering wheel or a dash board by the driver side.

3. The system of claim 1, wherein the database is in a server in communication with the vehicle or a storage medium in the identification device.

4. The system of claim 1, wherein the first threshold is smaller than the second threshold.

5. The system of claim 1, wherein the identification device is configured to compare the first image with the first stored user image via facial recognition.

6. The system of claim 5, wherein the identification device is further configured to compare the second image with the second stored user image based on auxiliary feature identification, wherein the auxiliary feature includes one of clothes colors, collars, accessories, hairstyles of the user in the second image and the second stored user image.

7. The system of claim 6, wherein the matching degree of the second image and the second stored user image is calculated based on a weighted matching degree of facial recognition and auxiliary features identification.

8. The system of claim 1, wherein the first vehicle operation includes unlocking a vehicle door, and the second vehicle operation includes starting an engine of the vehicle.

9. The system of claim 1, further comprising a mobile device, wherein the mobile device has a user interface for receiving inputs from a user to initiate the system, outputting notifications of vehicle operations to be performed to users, receiving inputs of confirmation on the vehicle operations from users, and outputting notifications of completed vehicle operations to users.

10. The system of claim 9, wherein the user interface is further configured to receive instruction to update the database, and the identification device is further configured to upload the second stored user image to the database and replace the first stored user image based on the instruction.

11. The system of claim 1, wherein a plurality of first images corresponding to a plurality of users are stored in the database, and the identification device is further configured to identify a current user is one of the plurality of users.

12. The system of claim 11, wherein the second vehicle operation further includes setting a group of vehicle functions to those associated with the one of the plurality of users.

13. A method for authorizing a user to operate a vehicle, comprising:
   receiving a first image of a user outside the vehicle with a first image capture device;
   comparing the first image with a first stored user image in a database to determine a first matching degree between the first image and the first stored user image;
   performing a first vehicle operation by a first operation execution device and uploading the first image to the database as a second stored user image if it is determined that the first matching degree is greater than a first threshold;
   receiving a second image of the user inside the vehicle with a second image capture device;
   comparing the second image with the second stored user image to determine a second matching degree between the second image and the second stored user image; and
   performing a second vehicle operation by a second operation execution device if it is determined that the second matching degree is greater than a second threshold.

14. The method of claim 13, wherein the first matching degree is determined based on facial recognition, and the second matching degree is determined based on facial recognition and auxiliary feature identification.

15. The method of claim 14, wherein the second matching degree is a weighted average of matching degree of the facial recognition and the auxiliary feature identification.

16. The method of claim 13, wherein performing the first vehicle operation includes unlocking a vehicle door, and performing the second vehicle operation includes starting an engine of the vehicle.

17. The method of claim 13, further including:
   receiving inputs of initiating the system from users;
   outputting notifications of vehicle operations to be performed to users;
   receiving inputs of confirmation of the vehicle operation from users; and
   outputting notifications of completed vehicle operations to users.

18. The method of claim 17, wherein the notifications are output to users via a text or an audio message.

19. The method of claim 13, further comprising: receiving inputs of updating the database, uploading the second stored user image to the database and replacing the first stored user image.

20. The method of claim 13, further comprising pre-storing a plurality of first stored user images corresponding to a plurality of users in the database to determine whether a current user is one of the plurality of users, wherein performing the second vehicle operation includes setting a group of vehicle functions to those associated with the one of the plurality users.

* * * * *